United States Patent
Tseng et al.

(10) Patent No.: US 8,851,405 B2
(45) Date of Patent: Oct. 7, 2014

(54) AUTO-FEEDING DEVICE FOR FOOD PROCESSOR

(76) Inventors: Rong-Yuan Tseng, Taipei County (TW); Bing-Huang Wu, Taoyuan County (TW)

( * ) Notice: Subject to any disclaimer, the term of this patent is extended or adjusted under 35 U.S.C. 154(b) by 159 days.

(21) Appl. No.: 13/642,590

(22) PCT Filed: May 13, 2010

(86) PCT No.: PCT/CN2010/000682
§ 371 (c)(1),
(2), (4) Date: Oct. 22, 2012

(87) PCT Pub. No.: WO2011/140678
PCT Pub. Date: Nov. 17, 2011

(65) Prior Publication Data
US 2013/0037638 A1 Feb. 14, 2013

(51) Int. Cl.
A47J 31/44 (2006.01)
A47J 43/046 (2006.01)
A47J 43/07 (2006.01)

(52) U.S. Cl.
CPC ............ *A47J 43/0716* (2013.01); *A47J 43/046* (2013.01)
USPC ........................ 241/46.02; 241/282.1; 99/510

(58) Field of Classification Search
CPC ...... A47J 43/046; A47J 43/0716; A47J 31/44
USPC ........... 241/46.02, 282.1, 282.2; 99/275, 509, 99/510
See application file for complete search history.

(56) References Cited

U.S. PATENT DOCUMENTS 7,587,974 B2 * 9/2009 Cohen et al. .................... 99/509

FOREIGN PATENT DOCUMENTS

WO WO 2008101773 A1 * 8/2008
WO WO 2008101800 A1 * 8/2008

* cited by examiner

*Primary Examiner* — Mark Rosenbaum
(74) *Attorney, Agent, or Firm* — Rosenberg, Klein & Lee

(57) ABSTRACT

An auto-feeding device includes a container provided on one side with a hollow sleeve; a bottom cover operably connected to an open bottom of the container; a fixing seat having an upright rod upwardly rotatably extended into the hollow sleeve and a stop rod normally located below the bottom cover; and a swaying arm upwardly connected to the fixing seat opposite to the stop rod. When the auto-feeding device is mounted on a bowl of a food processor filled with water, and blades in the bowl are rotated at a preset time to produce swirling water, the swaying arm is pushed by swirls to move the stop rod away from the bottom cover, so that the bottom cover turns downward to open the bottom of the container, allowing foodstuffs in the container to automatically fall into the bowl and be directly heated and ground into different types of food juice.

4 Claims, 6 Drawing Sheets

AUTO-FEEDING DEVICE FOR FOOD PROCESSOR

FIELD OF THE INVENTION

The present invention relates to a soybean milk maker, and more particularly to an auto-feeding device for a food processor. When the auto-feeding device is mounted on a bowl of the food processor filled with an amount of water and the food processor is set to actuate at a predetermined time, blades in the bowl are driven to rotate and produce swirling water when the preset time is reached, and a bottom cover of a container of the auto-feeding device is brought by the swirling water to open a bottom of the container, allowing foodstuffs in the container to automatically fall into the bowl and be heated and ground, so that soybean milk or other different types of food juice can be made with the food processor in a convenient manner.

BACKGROUND OF THE INVENTION

In a conventional way of making soybean milk, soybeans must be soaked overnight and are then ground, filtered and boiled. The soybeans tend to deteriorate in quality or even become rancid after having been soaked overnight, particularly in summer. In view that the quality-deteriorated or rancid soybean milk would have adverse influences on the food hygiene, it is tried by the inventor to develop an improved auto-feeding device for food processor, so that soybean milk and other different types of food juice can be made with a food processor in a more convenient and hygienic manner.

SUMMARY OF THE INVENTION

A primary object of the present invention is to provide an auto-feeding device for mounting on a bowl of a food processor. When the bowl is filled with an adequate amount of water and the food processor is set to automatically operate at a predetermined motor actuating time, blades in the bowl are driven by a motor to rotate and thereby produce swirling water in the bowl when the preset time is reached. At this point, a bottom cover of a container of the auto-feeding device is brought by the swirling water to open a bottom of the container, allowing foodstuffs, such as soybeans, in the container to automatically fall into the bowl and be heated and ground with water, so that soybean milk or other different types of food juice can be made with the food processor in a convenient manner and the soybeans do not need to be soaked overnight. With the auto-feeding device, the food processor is more practical and convenient for use.

To achieve the above and other objects, the auto-feeding device for food processor according to the present invention includes a container, a bottom cover, a fixing seat, a swaying arm, and a stirring bar. The container internally defines a receiving space, and is provided on one side with an upright hollow sleeve. The bottom cover is openably connected to an open bottom of the container. The fixing seat includes an upright rod, a horizontal plate connected at a first end to a lower end of the upright rod and formed on an opposite second end with a locating opening, and a stop rod forward extended from the first end of the horizontal plate. The swaying arm is formed of a plate and has an upper end formed into an engaging section for fixedly inserting into the locating opening on the fixing seat. The stirring bar has a cross section with a regular or irregular wavy peripheral edge, and has a lower end formed into an insertion section.

The upright rod of the fixing seat is upwardly extended into and rotatably received in the hollow sleeve of the container, the insertion section of the stirring bar is downwardly inserted into an upper end of the upright rod of the fixing seat; and the stop rod of the fixing seat is normally located below the bottom cover for the same to close the open bottom of the container. When the auto-feeding device with the open bottom of the container being closed by the bottom cover is mounted on a bowl of a food processor filled with an adequate amount of water, foodstuffs to be ground can be positioned in the container and the food processor can be preset to a predetermined motor actuating time; and when the preset motor actuating time is reached, blades in the bowl are driven by an actuated motor to rotate and produce swirling water in the bowl. The swirling water pushes against the swaying arm of the auto-feeding device and accordingly rotate the stop rod of the fixing seat away from the bottom cover, allowing the bottom cover to turn downward and thereby open the bottom of the container for the foodstuffs therein to automatically fall into the bowl of the food processor.

According to the present invention, the container is provided on one side of the open bottom with symmetrical retaining hooks, and the bottom cover is correspondingly provided on one side with fixing holes for movably engaging with the retaining hooks, so as to openably close the open bottom of the container.

According to the present invention, the upright rod of the fixing seat has a diametrically expanded upper end, which is provided with a downward extended slit and therefore gives the upright rod a certain degree of elasticity, allowing the upright rod to be more easily extended into the hollow sleeve and be firmly held therein.

According to the present invention, the swaying arm has an upper end formed into an engaging section provided with symmetrical slits, which give the engaging section a certain proper degree of elasticity, allowing the engaging section to be more easily inserted into the locating opening on the horizontal plate of the fixing seat and firmly connect the swaying arm to the fixing seat.

Compared with other existing technical means, the auto-feeding device of the present invention has the advantage of making the food processor more convenient for use in making hygienic soybean milk and other different types of food juice. To use the present invention, an amount of water is filled in the bowl of the food processor, and the auto-feeding device is mounted on the top of the bowl with the open bottom of the container being closed by the bottom cover. Then, desired foodstuffs, such as soybeans, miscellaneous grains, brown rice, sesames, peanuts and the like, are positioned in the container; and the food processor is set to automatically operate at a predetermined motor actuating time. When the preset motor actuating time is reached, blades in the bowl of the food processor are brought by an actuated motor of the food processor to rotate and accordingly produce swirling water in the bowl. The swirling water pushes against the swaying arm, so that the stop rod on the fixing seat is brought to move away from the bottom cover. At this point, the bottom cover automatically turns downward, allowing the foodstuffs in the container to fall into the bowl. Since the food processor can be set to a fully automatic operation mode, the foodstuffs, such as soybeans, fallen into the bowl are automatically heated and ground with water into soybean milk or other different types of juice without the need of soaking them in advance.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with a preferred embodiment thereof and with reference to the accompanying drawings.

Figure 1:
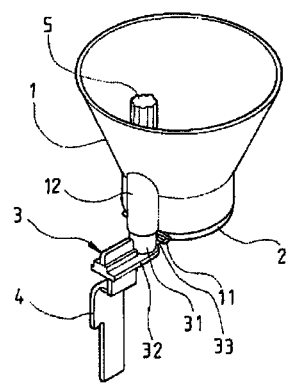
FIG. 1 is an assembled perspective view of an auto-feeding device for food processor according to a preferred embodiment of the present invention.
Figure 2:
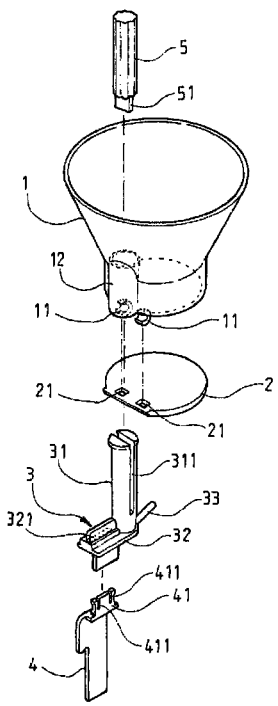
FIG. 2 is an exploded view of FIG. 1.

Please refer to FIGS. 1 and 2 that are assembled and exploded perspective views, respectively, of an auto-feeding device for food processor according to a preferred embodiment of the present invention. As shown, the auto-feeding device includes a funnel-like container 1 having an open bottom, a bottom cover 2, a fixing seat 3, a swaying arm 4, and a stirring bar 5.

The container 1 is provided on one side at the open bottom thereof with symmetrical arranged retaining hooks 11, and on the same side of its wall with an upright hollow sleeve 12.

The bottom cover 2 is provided on one side with fixing holes 21 corresponding to the retaining hooks 11 on the container 1, so that the bottom cover 2 is movably connected at the fixing holes 21 to the retaining hooks 11 for openably closing the open bottom of the container 1.

The fixing seat 3 includes an upright rod 31, which has a diametrically expanded upper end provided with a downward extended slit 311; a horizontal plate 32 having a first end connected to a lower end of the upright rod 31 and an opposite second end provided with a locating opening 321; and a stop rod 33 forward extended from the first end of the horizontal plate 32.

The swaying arm 4 is formed of a plate with an upper end formed into an engaging section 41. The engaging section 41 is provided with symmetrical slits 411 to thereby have a certain proper degree of elasticity. The swaying arm 4 is upward connected to the horizontal plate 32 of the fixing seat 3 by inserting the engaging section 41 into the locating opening 321. With the proper degree of elasticity due to the slits 411, the engaging section 41 can be more easily inserted into and engaged with the locating opening 321.

The stirring bar 5 has a cross section with a regular or irregular wavy peripheral edge and is provided at a lower end with an insertion section 51.

When the auto-feeding device of the present invention is fully assembled, the upright rod 31 of the fixing seat 3 is upward extended into and rotatably received in the hollow sleeve 12 of the container 1. With the slit 311, the upper end of the upright rod 31 is provided with a certain degree of elasticity and can therefore be more easily extended into and more firmly held in the hollow sleeve 12. Meanwhile, the stirring bar 5 is connected to the upper end of the upright rod 31 of the fixing seat 3 with the insertion section 51 inserted in the slit 311. The stop rod 33 of the fixing seat 3 is normally located below the bottom cover 2 for the same to close the open bottom of the container 1. To use the auto-feeding device of the present invention, simply mount it on a bowl of a food processor, and then position foodstuffs to be ground, such as soybeans, miscellaneous grains, brown rice, sesames, peanuts and the like, in the container 1 of the auto-feeding device. The bowl of the food processor is filled with a predetermined amount of water in advance and the food processor is set to a predetermined motor actuating time. When the preset motor actuating time is reached, blades in the bowl are driven by an actuated motor to rotate and thereby produce swirling water in the bowl. The swirling water pushes against the swaying arm 4, so that the stop rod 33 of the fixing seat 3 is rotated away from the bottom cover 2, allowing the bottom cover 2 to turn downward and thereby open the bottom of the container 1. At this point, the foodstuffs in the container 1 automatically fall into the bowl via the open bottom of the container 1 and are ground into soybean milk or other different types of juice, making the food processor more convenient for use.

Figure 3:
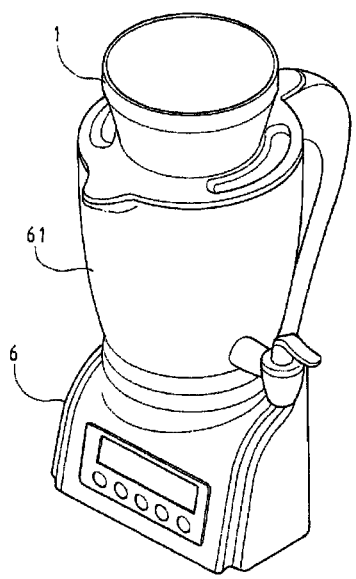
FIGS. 3 and 4 are perspective and sectional side views, respectively, showing the use of the auto-feeding device of the present invention with a food processor.
Figure 4:
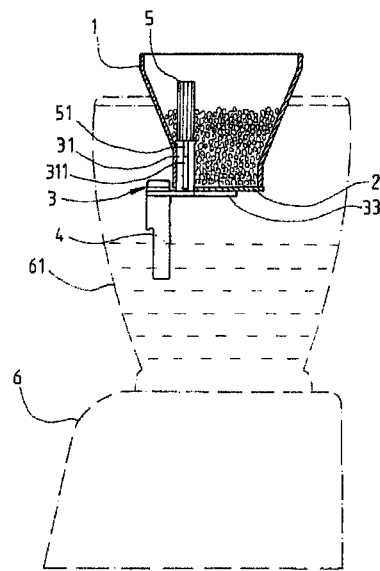

Please refer to FIGS. 3 and 4 at the same time, which show the mounting of the auto-feeding device of the present invention on a top of a bowl 61 of a food processor 6 for use. Before mounting the auto-feeding device, first set the stop rod 33 of the fixing seat 3 to an underside of the bottom cover 2, so that the bottom cover 2 closes the open bottom of the container 1. Then, position foodstuffs 7 to be ground, such as soybeans, miscellaneous grains, brown rice, sesames, peanuts and the like, in the container 1 and pour an adequate amount of water into the bowl 61. Thereafter, set a timer on a base of the food processor 6 for a motor of the food processor 6 to actuate at a predetermined time. By setting the food processor 6 to a fully automatic operating mode, the foodstuffs in the container 1, such as soybeans, will automatically fall into the bowl of the food processor and be heated and ground into soybean milk when the food processor 6 is actuated at the preset time. There is no need to soak the soybeans 7 in advance.

Figure 5:
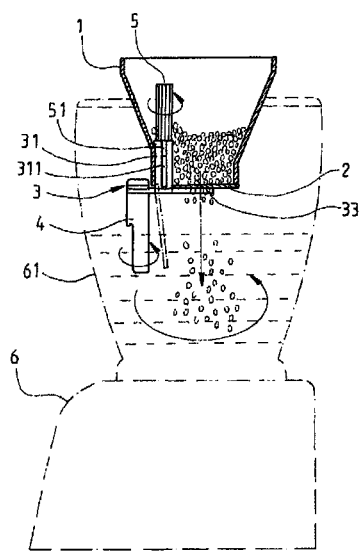
FIGS. 5 and 6 are sectional side and perspective views, respectively, showing how the auto-feeding device of the present invention operates.
Figure 6:
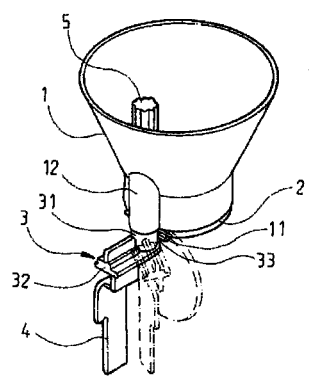

FIGS. 5 and 6 show the operation of the auto-feeding device of the present invention. As shown, an amount of water is filled in the bowl 61 of the food processor 6, and the auto-feeding device is mounted on the top of the bowl 61 with the open bottom of the container 1 being closed by the bottom cover 2. Then, desired foodstuffs 7, such as soybeans, miscellaneous grains, brown rice, sesames, peanuts and the like, are positioned in the container 1; and the food processor 6 is set to automatically operate at a predetermined time. When the preset actuating time is reached, blades in the bowl 61 of the food processor 6 are brought by an actuated motor of the food processor 6 to rotate and accordingly produce swirling water in the bowl 61. The swirling water pushes against the swaying arm 4 connected to below the fixing seat 3, so that the whole fixing seat 3 is driven to rotate relative to the hollow sleeve 12 and the stop rod 33 on the fixing seat 3 is brought to move away from the underside of the bottom cover 2. At this point, the bottom cover 2 automatically turns downward under its own weight and the weight of the foodstuffs 7 to open the bottom of the container 1, allowing the foodstuffs 7 in the container 1 to fall into the bowl 61. Since the food processor 6 can be set to a fully automatic operation mode, the foodstuffs 7, such as soybeans, fallen into the bowl 61 are automatically heated and ground with water into soybean milk or other different types of juice without the need of soaking them in advance. When the fixing seat 3 is driven by the swirling water to rotate relative to the hollow sleeve 12, the stirring bar 5 inserted into the slit 311 of the upright rod 31 of the fixing seat 3 is also brought by the fixing seat 3 and the swaying arm 4 to rotate in the container 1. The wavy peripheral edge of the rotated stirring bar 5 stirs the foodstuffs 7, so that the foodstuffs 7 can fall into the bowl 61 in a smoother manner. With the auto-feeding device mounted thereto, the food processor 6 is more convenient for use. The food processor 6 not only has a fully automatic operation function for automatically heating and grinding the foodstuffs 7 into juice, such as grinding soybeans into soybean milk, but also has the advantageous non-stick and anti-overflow effects. Therefore, soybean milk and other types of food juice made with the auto-feeding device of the present invention and the food processor are more delicious in taste.

In summary, the auto-feeding device for food processor according to the present invention includes a container and a bottom cover openably closing an open bottom of the container, and when the food processor is actuated at a preset time and the blades thereof rotate to swirl the water in the bowl, the bottom cover automatically opens and foodstuffs in the container of the auto-feeding device automatically fall into the food processor and be ground with water to make different types of food juice, such as soybean milk, without the need of soaking the foodstuffs overnight. Therefore, with the auto-feeding device of the present invention, the food processor is more practical and more convenient for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An auto-feeding device for food processor, comprising:
    a container defining an inner receiving space and being provided on one side with an upright hollow sleeve;
    a bottom cover being movably connected to one side of an open bottom of the container for openably closing the open bottom;
    a fixing seat including an upright rod, a horizontal plate having a first end connected to a lower end of the upright rod and an opposite second end provided with a locating opening, and a stop rod forward extended from the first end of the horizontal plate;
    a swaying arm being formed of a plate with an upper end formed into an engaging section for upwardly inserting into the locating opening on the horizontal plate of the fixing seat; and
    a stirring bar having a cross section with a regular or irregular wavy peripheral edge and being provided at a lower end with an insertion section;
    wherein the upright rod of the fixing seat is upwardly extended into and rotatably received in the hollow sleeve of the container; the insertion section of the stirring bar is downwardly inserted into an upper end of the upright rod of the fixing seat; and the stop rod of the fixing seat is normally located below the bottom cover for the same to close the open bottom of the container;
    whereby when the auto-feeding device with the open bottom of the container closed by the bottom cover is mounted on a bowl of a food processor and the bowl has an amount of water filled therein, foodstuffs to be ground can be positioned in the container and the food processor can be set to automatically operate at a predetermined motor actuating time; so that when the preset motor actuating time is reached, blades in the bowl are driven by an actuated motor to rotate and thereby produce swirling water, which pushes against the swaying arm of the auto-feeding device and accordingly rotate the stop rod of the fixing seat away from the bottom cover, allowing the bottom cover to turn downward and thereby open the bottom of the container for the foodstuffs in the container to automatically fall into the bowl of the food processor via the open bottom of the container.

2. The auto-feeding device for food processor as claimed in claim 1, wherein the container is provided on one side of the open bottom with symmetrical retaining hooks, and the bottom cover is correspondingly provided on one side with fixing holes for movably engaging with the retaining hooks, so as to openably close the open bottom of the container.

3. The auto-feeding device for food processor as claimed in claim 1, wherein the upright rod of the fixing seat has a diametrically expanded upper end, which is provided with a downward extended slit and therefore gives the upright rod a certain degree of elasticity, allowing the upright rod to be more easily extended into the hollow sleeve and be firmly held therein.

4. The auto-feeding device for food processor as claimed in claim 1, wherein the swaying arm has an upper end formed into an engaging section provided with symmetrical slits, which give the engaging section a certain proper degree of elasticity, allowing the engaging section to be more easily inserted into the locating opening on the horizontal plate of the fixing seat and firmly connect the swaying arm to the fixing seat.

* * * * *